UNITED STATES PATENT OFFICE 2,403,683

COMPOUNDS OF THE CYCLOPENTANO-POLYHYDROPHENANTHRENE SERIES AND PROCESS OF MAKING SAME

Tadeus Reichstein, Basel, Switzerland

No Drawing. Application February 4, 1943, Serial No. 474,726. In Switzerland April 25, 1942

12 Claims. (Cl. 260—397.1)

It has been found that compounds of the cyclopentanopolyhydrophenanthrene series containing oxygen, or groups including oxygen, in ring C, can be produced by treating compounds of this series, containing a nuclear double bond in which the carbon atom 11 participates, with agents capable of eliminating this double bond with production of addition compounds, in which at least one of the valencies having taken part in the double bond is occupied by oxygen and, if desired, reacting the products obtained with oxidizing and/or reducing agents, or agents which effect isomerization of an oxide grouping into the keto form. The products obtained in this way may subsequently be treated with hydrolyzing, esterifying, oxidizing, reducing or halogenizing reagents or agents which eliminate hydrohalide, either singly or in combination, in any order of succession.

The compounds mentioned above which are unsaturated in ring C are obtained, for example, according to the process described in U. S. patent applications Nos. 433,072 and 435,570 from the corresponding compounds containing, for instance in the 12 position, a free or substituted hydroxyl group; or by degradation of the side chain as described in U. S. patent appl. Ser. No. 472,158. The remaining rings of the nucleus are saturated or unsaturated. The starting products may further be substituted in any way, e. g. in the 3, 7 and/or 17 position. The following compounds may for example be used: $\Delta^{11,12}$-3-hydroxy-cholenic acid, $\Delta^{11,12}$-3-keto-cholenic acid, $\Delta^{11,12}$-3,7-dihydroxy-cholenic acid, $\Delta^{5:6,11:12}$-3-hydroxy-choladienic acid, $\Delta^{5:6,11:12}$-3-keto-choladienic acid, $\Delta^{11,12}$-pregnen-3,20-dione, $\Delta^{4:5,11:12}$-pregnadiene-3,20-dione, $\Delta^{11,12}$-etiocholene-3,17-dione, $\Delta^{4:5,11:12}$-etio-choladiene-3,17-dione, the lower homologues of the above acids as, for example, $\Delta^{11,12}$-3-hydroxy-etio-cholenic acid or $\Delta^{11,12}$-3-keto-etiocholenic acid or the corresponding nor-cholenic acid or bisnor-cholenic acid. The corresponding derivatives esterified in the hydroxyl and/or carboxyl groups and analogous compounds unsaturated in the 9,11 position may also be used.

The starting materials containing a double bond in ring C are treated, according to the present process, with agents capable of forming, with removal of this double bond, addition compounds in which at least one of the newly available valencies is occupied by oxygen. In particular therefore, oxidizing agents are used which are capable of adding oxygen or groups including oxygen to the double bond, e. g. peroxides such as hydrogen peroxide or per-acids, metal oxides such as osmium tetroxide or vanadic acid, if desired in the presence of chlorates; further permanganates, lead tetra-acylates, aryl iodoso-acylates or a halogen-silver benzoate complex. Hypohalogenous acids, their salts, ethers or esters, or substances which give off hypohalogenous acids in the presence of water, e. g. bromacetamide or toluene-sulpho-chloramine, may be used instead of the oxidizing agents mentioned, particularly when starting from 11,12 unsaturated compounds.

Halo-hydrins obtained can be subsequently converted into oxides by the action of substances which split off hydrohalide, e. g. alkaline substances, in particular aluminium oxide. In this way oxides are generally obtained which are stereoisomers of those prepared directly by the action of peroxides on the unsaturated starting materials.

Oxide groups can be split up with reducing agents, e. g. with amalgams, with metal alcoholates or phenolates such as those of aluminium or magnesium, in the presence of secondary alcohols, with alkali metals and alcohols, with catalytically activated (e. g. by metals) hydrogen, or by electrolytic or biochemical means. Oxide groups may also be converted directly into keto groups by using the known methods which effect isomerization of an oxide into the keto form, e. g. with dilute aqueous or alcoholic acids or alkalis, zinc chloride or concentrated acids such as 80% phosphoric acid.

Halogen atoms which have been introduced, as for example in the halohydrins, can also be removed by means of suitable reducing agents, e. g. zinc and glacial acetic acid. Advantageously, prior to this reduction adjacent free hydroxyl groups which may be present, are converted into keto groups. The oxidizing or equivalent dehydrogenating agents suitable for this purpose are well known.

The products may subsequently be further converted in a known way, by esterification, saponification, oxidation or dehydrogenation, reduction, halogenation, elimination of acid, or a combination of these reactions in any order of succession. For example partially esterified glycols, e. g. glycol-mono-acylates or halo-hydrins may be directly converted in known way into ketones, by treatment with agents eliminating acid, such as finely divided metals (in particular zinc) in inert diluents, or with suitable reagents which eliminate hydrohalide. The formation of ketones in this reaction presumably is attributable to the already mentioned isomerizing ability of ring oxides intermediately formed.

By the present process there may be thus obtained the following intermediate and final products: Compounds of the cyclopentanopolyhydrophenanthrene series (among others saturated ones in which the rings A and B are linked together in cis-position), which contain, instead of the initial double bond in ring C, as sole substituent in this ring and preferably in 11-position a keto group, or free or esterified hydroxyl group, Compounds of this type have been described formerly in the literature as obtained by transformation and degradation of aglucones with cardiac activity like digoxigenin. It has been shown recently that the original hydroxyl group in ring C of the latter compounds is not located in 11 position, so that all the described corresponding transformation and degradation products cannot have the claimed constitution with a substituent in 11-position. Saturated compounds of the said configuration in reality were obtained for the first time according to the present process. Other products obtained by this process contain at both the carbon atom 11 and a nuclear carbon atom vicinal thereto, as substituents hydroxyl, esterified hydroxyl (which means also halogen), ketonic oxygen or oxydic oxygen.

Below are given a number of examples of the invention, without thereby limiting it in any way.

Example 1

2 g. of $\Delta^{11,12}$-cholenic acid methyl-ester (obtained in platelets, M. Pt. 56–58° C. or in needles M. Pt. 61° C., for example from 12-hydroxycholanic acid methyl-ester, M. Pt. 119–121° C., by benzoylation and subsequent elimination of benzoic acid at 260–340° C.) are dissolved in 90 cc. of tertiary butyl alcohol, and 40 cc. of water added to the solution. 1.484 g. (2 mols) of bromacetamide are added and the solution allowed to stand in the dark whereby it becomes yellow after a few hours and is coloured dark brown on the next day. It is decolourized by the addition of 4.35 cc. N/10 thio-sulphate solution and the majority of the butyl alcohol destilled off in vacuo at a bath temperature of 40° C. The suspension is extracted three times with ether, the ethereal solution washed with very dilute thio-sulphate solution, sodium carbonate solution and water, dried and evaporated. The residue obtained is dissolved in 24 cc. of glacial acetic acid, and 24 cc. of a 2% solution of chromic acid (480° mg. $CrO_3$) are added. After standing overnight, the greenish brown solution is diluted with 500 cc. of water and then extracted three times with a large quantity of ether. The ether solutions are washed until neutral, dried and evaporated down. The residue is dissolved in 20 cc. of glacial acetic acid and heated for 30 minutes on a boiling water bath with 3 g. of zinc dust, stirring frequently. The solution is then evaporated to dryness in vacuo, the residue repeatedly extracted with ether and the ether solution washed with water, sodium carbonate solution and water, dried and evaporated down. The residual crude product is dissolved in petroleum ether and chromatographed through 90 g. of aluminum oxide.

For elution, petroleum ether and then a mixture of benzene and petroleum ether are used, when unchanged parent material is at first obtained and afterwards fractions yielding prisms of melting point 88–89° C. and the specific rotation $[\alpha]_D^{19} = +46.0° \pm 1°$ (concentration 2.024 in acetone). This substance is 11-keto-cholanic acid methyl-ester. From the last fractions extracted with mixtures of benzene and petroleum ether, $\Delta^{9,11}$-12-keto-cholenic acid methyl-ester can be isolated, which, after recrystallization from methyl alcohol, melts at 88–90° C.

Acetone for example may also be used as solvent instead of tertiary butyl alcohol. Addition of for example glacial acetic acid accelerates the reaction, which can also be carried out in heterogeneous phases, e. g. in ether and water.

Example 2

100 mg. of $\Delta^{11,12}$-cholenic acid methyl-ester are boiled for 15 minutes with 1.55 cc. of a 2 per cent solution of caustic potash in methyl alcohol, with addition of 0.1 cc. water. The methyl alcohol is then removed in vacuo, the solution acidified and extracted three times with ether. The ether solutions are washed with water, dried and evaporated down. The residue is dissolved in 7 cc. of tertiary butyl-alcohol, 0.13 cc. of 2N caustic soda solution added and then N/10 caustic soda solution until a faint pink colouration is obtained with phenolphthalein. After the excess of alkali has been removed by running in carbon-dioxide, a freshly filtered solution of hypobromous acid, prepared at 0° C. from 0.08 cc. bromine, about 1 cc. of water and an excess of silver carbonate, is added at 0° C. and the mixture allowed to stand in an ice box for 20 hours. (The acid solution contains, as was established by a preliminary experiment about 3 molecules of hypobromous acid.) There is no separation of bromine. After the addition of some sodium bisulphite solution the mixture is weakly acidified with hydrochloric acid, diluted with plenty of water and extracted three times with ether. The ether solutions are washed with hydrochloric acid and water, dried, concentrated, and an excess of diazomethane solution is added. After 5 minutes the solution is worked up in the usual way, 1.5 cc. of glacial acetic acid and 1.5 cc. of a 2% chromic acid solution are added to the crude product, and the whole is allowed to stand for 46 hours. The oxidation product is then debrominated with 500 mg. of zinc dust in 5 cc. of glacial acetic acid by heating for 15 minutes on a water bath. The crude product obtained in this way is dissolved in petroleum ether and chromatographed through a column containing 3 g. aluminium oxide, when the 11-keto-cholanic acid methyl-ester of M. Pt. 88–89° C., described in Example 1, can be isolated.

Instead of hypobromous acid there may be used its esters, ethers or salts, for example the methyl or ethyl ester, or the hypobromous acid may be used in presence of acetic acid whereby an acetylated halohydrin is obtained.

Example 3

100 mg. of $\Delta^{11,12}$-cholenic acid methyl-ester are dissolved in 4.5 cc. of tertiary butyl alcohol and 0.5 cc. glacial acetic acid. A solution of 151.5 mg. of the sodium salt of toluene-sulfochloramine in 2 cc. of water is added, and the whole allowed to stand for 24 hours. The solution is then diluted with much water, extracted with ether, the ethereal solution washed until neutral, dried and evaporated down. The residue is allowed to stand overnight in 1.5 cc. glacial acetic acid with 1.5 cc. of a 2% chromic acid solution. The oxidation product, after working up, is dechlorinated by heating for 45 minutes with 500 mg. of zinc dust in 5 cc. of glacial acetic acid. The crude product obtained in this way gives, on chromatography, in an analogous way to that described in Example 1, the 11-keto-cholanic acid methyl-ester, M. Pt. 88–89° C.

100 mg. of 11-keto-cholanic acid methyl-ester are hydrogenated in 4 cc. of glacial acetic acid with 55.4 mg. platinum oxide. After hydrogenation is complete, the platinum is filtered off, the filtrate evaporated down in vacuo, the residue dissolved in ether and the ether solution washed until neutral, dried and evaporated down. The crude product obtained is first recrystallized from petroleum ether, then from methyl alcohol with the addition of a little water. In this way bunches of needles are obtained which after washing with diluted methyl alcohol and drying melt at 87–88° C. The mixed melting point with the keto-ester is 60–77° C. and the specific rotation $$[\alpha]_D^{18} = +49.8° \pm 2°$$

(concentration 1.505 in acetone). The product is an 11-hydroxy-cholanic acid methyl-ester.

Instead of platinum oxide and glacial acetic acid the reduction can also be carried out with Raney nickel in methyl alcohol.

Example 4

200 mg. of $\Delta^{11,12}$-3-keto-cholenic acid methyl-ester, M. Pt. 122–124° C. (obtained by the process described in U. S. patent application Serial No. 433,072) are dissolved in 12 cc. of tertiary butyl alcohol (or 16 cc. acetone). To this solution a solution of 140 mg. of N-bromacetamide in 4 cc. of water is added and the whole allowed to stand for 16 hours at room temperature, when 1.6 mols of the agent are used. After diluting with water the mixture is concentrated down in vacuo, the suspension extracted with ether, the ether solution washed with sodium carbonate solution and water, dried over sodium sulphate and evaporated down. The crude residue is then dissolved in 4 cc. of glacial acetic acid, a solution of 48 mg. of chromium trioxide and 2.4 cc. glacial acetic acid added and the whole allowed to stand for 16 hours at 20° C. It is then evaporated down in vacuo at a bath temperature of 25–30° C., water added to the residue, and extracted with ether. The ether solution is washed with dilute sulphuric acid, sodium carbonate solution and water, dried over sodium sulphate and evaporated down. The residue is dissolved in 4 cc. of glacial acetic acid, 150 mg. of zinc dust added and the whole heated for 15 minutes on a boiling water bath, shaking continually. The solution is again evaporated down in vacuo, water is added to the residue, and the mixture extracted with ether. After washing the ether solution with dilute hydrochloric acid, sodium carbonate solution and water, and drying over sodium sulphate, it leaves a residue on evaporating down which is dissolved in 1 cc. of absolute benzene and 19 cc. of petroleum ether. This solution is chromatographed by allowing to run through about 6 g. of aluminium oxide. The fractions obtained by elution with mixtures of benzene and petroleum ether and the first ones obtained with pure benzene give the unchanged parent material. M. Pt. 122° C. Further fractions extracted with benzene give, after recrystallization from ether-petroleum ether mixtures, 3,11-diketo-cholanic acid methyl-ester of the formula

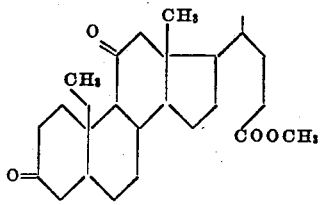

It forms colourless platelets, melting at 82–84° C., shows a specific rotation $[\alpha]_D^{17} = +61.7° \pm 2°$ (concentration 1.239 in acetone), and gives no yellow colour with tetranitromethane. By saponification with, for example, alkaline agents the corresponding free carboxylic acid is obtained which afterwards may be converted into any other ester.

The last fractions extracted with benzene and those extracted with benzene-ether mixtures give, crystallized from ether and petroleum ether, the $\Delta^{9,11}$-3,12-diketo-cholenic acid methyl-ester as colourless flat needles of M. Pt. 131–132° C. and specific rotation $[\alpha]_D^{15} = -72° \pm 2°$ (concentration 1.22 in acetone). The ultraviolet absorption spectrum in alcohol shows a maximum at 238 m$\mu$ (log $\epsilon$ = 3.92).

Example 5

1 g. of $\Delta^{11,12}$-3-acetoxy-cholenic acid methyl-ester of M. Pt. 117–118° C. (obtained for example as described in U. S. patent application Serial No. 433,072) is dissolved in 100 cc. of acetone, a solution of 720 mg. N-bromacetamide in 20 cc. of water added and the whole allowed to stand at 20° C. for 16 hours. More water is then added, the acetone removed in vacuo, the residue extracted with ether, the ether solution washed with a solution of sodium carbonate and water, dried over sodium sulphate and evaporated down. The crystalline residue is dissolved in 5 cc. of chloroform and 5 cc. of glacial acetic acid, 20 cc. of a 2% solution of chromium trioxide in glacial acetic acid added and the whole allowed to stand at 20° C. for 16 hours. After removal of the glacial acetic acid in vacuo at a bath temperature of 30° C., water is added to the residue, the whole is extracted with ether, the ether solution washed with dilute sulphuric acid, sodium carbonate solution and water, dried over sodium sulphate and concentrated down. The residue is dissolved in 8 cc. of glacial acetic acid, 0.7 g. of zinc dust and 0.5 g. of sodium acetate added and the whole heated for 15 minutes on a boiling water bath, shaking continually. The mixture is then filtered and the filtrate evaporated down in vacuo. Water is added to the residue, the mixture extracted with ether, the ether solution washed with dilute hydrochloric acid, sodium carbonate solution and water, dried over sodium sulphate and evaporated down. The crystalline resin obtained in this way melts in the crude state at 90–130° C. It is separated by chromatographing over 30 g. of aluminium oxide. The fractions obtained by elution with petroleum ether and with a mixture of benzene and petroleum ether (1:2) yield the unchanged parent material, M. Pt. 117–118° C.

The fractions extracted with benzene-petroleum ether mixture (1:1) and the first fractions extracted with absolute benzene give 3-acetoxy-11-keto-cholanic acid methyl-ester of the formula

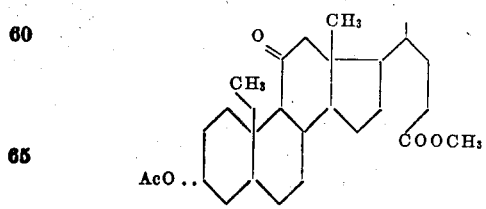

The colourless platelets obtained from ether-petroleum ether melt at 132–133° C. and show a specific rotation $[\alpha]_D^{17} = +67.1° \pm 2°$ (concentration 1.557 in acetone). The product may be saponified in known manner to the free 3-hydroxy-11-keto-cholanic acid.

The further fractions eluted with absolute benzene and a mixture of benzene and ether give, after recrystallization from acetone, Δ⁹,¹¹-3-acetoxy-12-keto-cholenic acid methyl-ester as colourless platelets, melting at 149–150° C. and having a specific rotation $[\alpha]_D^{17} = +102.5° \pm 2°$ (concentration 1.979 in acetone). In the ultraviolet absorption spectrum in alcoholic solution a maximum was found at 241 mμ (log ε=3.91).

In an analogous manner the 3-acetoxy-11-keto-cholanic acid methyl-ester of M. Pt. 176–178° C. and specific rotation $[\alpha]_D^{17} = +56.4° \pm 2°$ (concentration 1.0633 in acetone) is obtained in addition to Δ⁹,¹¹-3-acetoxy-12-keto-cholenic acid methyl-ester, M. Pt. 195–196°, from the stereoisomeric Δ¹¹,¹²-3-acetoxy-cholenic acid methyl-ester, M. Pt. 146–149° C. (cf. U. S. patent application Serial No. 433,072).

102 mg. of 3-acetoxy-11-keto-cholanic acid methyl-ester, of M. Pt. 132–133° C., are dissolved in glacial acetic acid and hydrogenated with 74 mg. of platinum oxide. The absorption of gas is practically ended after 6 hours. To be on the safe side, shaking is continued for 24 hours. After filtration, the filtrate is evaporated down in vacuo, the residue dissolved in ether, the ether solution washed with sodium carbonate solution and water, dried over sodium sulphate and concentrated down to a small volume. On standing, 3-acetoxy-11-hydroxy-cholanic acid methyl-ester of the formula

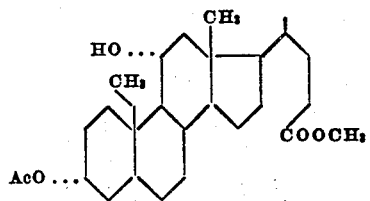

crystallizes out in long needles, melting at 146–148° C. The specific rotation is $[\alpha]_D^{17} = +70.7° \pm 2°$ (concentration 1.018 in acetone). This product may be esterified also in 11 position by energetic action of esterifying agents.

70 mg. 3-acetoxy-11-keto-cholanic acid-methyl-ester, M. Pt. 132–133° C., are boiled under reflux for 30 minutes with a solution of 70 mg. of caustic alkali in 4 cc. methyl alcohol. The solution is then diluted with water, the methyl alcohol removed in vacuo, hydrochloric acid is added until an acid reaction to congo is reached, and the precipitated acid is extracted with ether. The ether solution is washed with water, dried over sodium sulphate and evaporated down. The 3-hydroxy-11-keto-cholanic acid obtained in this way melts in the crude state at 218–223° C. 55 mg. of the methyl-ester prepared from it with the aid of diazomethane are oxidized with a solution of 14 mg. of chromium trioxide in 1.5 cc. of glacial acetic acid for 16 hours. After working up in the usual way, 3,11-diketo-cholanic acid methyl-ester is obtained which melts after recrystallization at 82–84° C. It has the formula

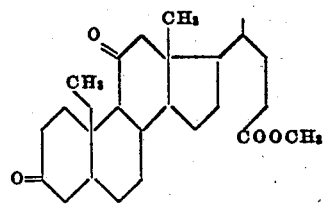

The same product can also be obtained if, instead of Δ¹¹,¹²-3-acetoxy-cholenic acid methyl-esters of M. Pt. 117–118° C. or 146–149° C., the corresponding non-acetylated compounds of M. Pt. 100–101° C. or 109–110° C. are used. In this case the 3,11-diketo compound is obtained directly as a result of the oxidizing action of bromacetamide, in place of which other hypohalide derivatives can also be used.

0.5 g. of 3,11-diketo cholanic acid methyl-ester is hydrogenated in 8 cc. of pure glacial acetic acid with the addition of 24 mg. of platinum oxide. During 25 minutes, 39.2 cc. of hydrogen are absorbed (theoretically for 1 mol, 32.3 cc.) and afterwards the absorption continues only very slowly. It is interrupted, the mixture filtered, washed with ether and evaporated down. The residue is dissolved in chloroform and ether, the solution washed with sodium carbonate solution and water, dried over sodium sulphate and evaporated down in vacuo. By separation of the reaction mixture thus obtained with digitonin, a 3-hydroxy-11-keto-cholanic acid methyl-ester, M. Pt. 152–153° C., is obtained as main product, together with the corresponding compound isomeric in 3-position. The ester of M. Pt. 152–153° C. gives a 3-acetate of M. Pt. 176–178° C. which is identical with that formerly described.

495 mg. of this 3-acetoxy-11-keto-cholanic acid methyl-ester, M. Pt. 176–178° C., are hydrogenated in 8 cc. of pure glacial acetic acid with 98 mg. of platinum oxide. The absorption of hydrogen is almost complete after 8 hours, after which the reaction is activated by shaking up with air, the mixture further hydrogenated and this treatment repeated. Altogether, shaking is continued for 24 hours in an atmosphere of hydrogen. The mixture is then filtered, washed with ether and the filtrate evaporated down in vacuo. The residue is dissolved in much ether, the solution washed with dilute hydrochloric acid, sodium carbonate solution and water, dried over sodium sulphate, and concentrated down to a small volume. The crystals separating out are recrystallized from a large quantity of ether. In this way a 3-acetoxy-11-hydroxy-cholanic acid methyl-ester, M. Pt. 139–140° C. and specific rotation $[\alpha]_D^{20} = +50.0° \pm 2°$ (concentration 0.992 in acetone) is obtained, being a stereo-isomer of the compound described above.

Example 6

(a) 200 mg. of Δ¹¹,¹²-3-keto-etio-cholenic acid methyl-ester, M. Pt. 137–139° C. (obtained e. g. by the process described in U. S. pat. appln. Serial No. 433,072 or No. 472,158) are dissolved in 16 cc. of acetone, a solution of 160 mg. of N-bromacetamide in 4 cc. of water is added and the whole allowed to stand at room temperature for 16 hours. After the addition of some water, the acetone is removed in vacuo, the residue extracted with ether, the ether solution washed with sodium carbonate solution and water, dried over sodium sulphate and evaporated down. The residue gives, on crystallizing from a mixture of ether and petroleum ether, the halohydrin of M. Pt. 190–192° C. and the formula:

(b) To 55 mg. of the crystals melting at 190–192° C. are added 2 cc. of glacial acetic acid and then a solution of 13 mg. of chromium trioxide in 0.65 cc. glacial acetic acid and the whole allowed to stand for 16 hours at room temperature. It is then evaporated down in vacuo at 30° C., water added to the residue, extracted with ether, the ether solution washed with dilute sulphuric acid, sodium carbonate solution and water, dried over sodium sulphate and evaporated down. The residue gives, from an ether-petroleum ether mixture, crystals of the keto-bromide, M. Pt. 171–178° C., having the formula

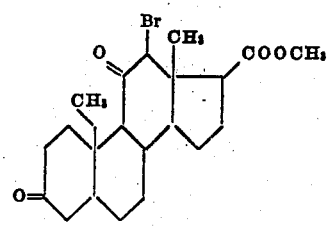

(c) 15 mg. of the keto-bromide, M. Pt. 171–178° C., are dissolved in a little glacial acetic acid and heated for 15 minutes on a boiling water bath with 10 mg. of zinc dust, shaking continually. The solution is evaporated down in vacuo, water added to the residue, and the latter extracted several times with ether. The ether solution is washed with dilute sulphuric acid, sodium carbonate solution and water, dried over sodium sulphate and evaporated down. The residue gives, from ether, the 3,11-diketo-etio-cholanic acid methyl-ester, M. Pt. 186–190° C., having the formula

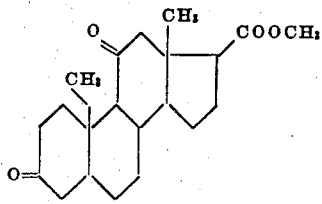

Specific rotation is $[\alpha]_D^{16} = +92.8° \pm 2°$ (concentration 1.250 in acetone).

From the mother liquors in (b) and (c) further quanties of this compound can be obtained, after debromination, together with $\Delta^{9,11}$-3,12-diketo-etio-cholenic acid methyl-ester, M. Pt. 176–179° C. The specific rotation of the latter compound is $[\alpha_D^{14} = +91.1° \pm 2°$ (concentration 1.031 in acetone). The alcoholic solution shows in the ultraviolet absorption spectrum strong selective absorption with a maximum at 239.5 m$\mu$ (log $\epsilon$=4.0).

(d) 34 mg. of 3,11-diketo-etio-cholanic acid methyl-ester, M. Pt. 186–190° C., are dissolved in 0.2 cc. glacial acetic acid. To this solution 0.2 cc. of a bromine solution in glacial acetic acid is gradually added, which has been prepared by mixing 0.1 cc. bromine with 3.84 cc. glacial acetic acid. After decolourization is complete, the solution is concentrated in vacuo, and the crystals thus separated out are washed with some ether. The product obtained has the formula:

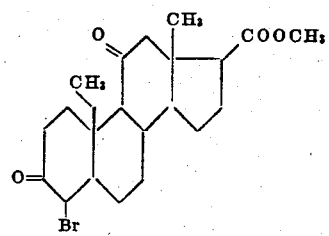

and melts at 185–193° C.

(e) This product is boiled with pyridine under reflux. The solution is evaporated down in vacuo, the residue dissolved in ether, the ethereal solution washed with dilute hydrochloric acid, sodium carbonate solution and water, dried over sodium sulphate and evaporated down. The residue is chromatographed, when the fractions eluted with absolute benzene and with a mixture of benzene and ether yield the $\Delta^{4,5}$-3,11-diketo-etio-cholenic acid methyl-ester of the following formula:

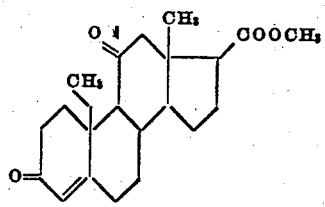

The product, on recrystallization from ether, melts at 174–177° C. A sample mixed with one of the acid ester, M. Pt. 177–181° C., prepared from corticosterone by oxidation with chromic acid and subsequent methylation, gives no depression of melting point.

(f) 1.1 g. of 3,11-diketo-etio-cholanic acid methyl-ester M. Pt. 186–190° C., are hydrogenated in 16 cc. of pure glacial acetic acid with 30 mg. platinum oxide. The absorption of gas is very rapid at the beginning and ceases almost completely after 30 minutes, when the hydrogenation is discontinued. It is then filtered, washed with ether, the filtrate evaporated down in vacuo, the residue dissolved in ether, the solution washed with dilute hydrochloric acid, sodium carbonate solution and water, dried over sodium sulphate and evaporated down to a small volume. On boiling, 3-hydroxy-11-keto-etio-cholanic acid methyl-ester crystallizes out in elongated platelets of M. Pt. 170–174° C. By working up the mother liquors a further quantity of this ester is obtained together with the corresponding compound, stereoisomeric in the 3-position, M. Pt. 157–159° C.

By acetylation the corresponding stereoisomeric 3-acetoxy-11-keto-etio-cholanic acid methyl-esters, M. Pt. 129–131° C., and 148–151° C. (see Example 7) are obtained. The compound melting at 129–131° C. can be saponified to the free 3-hydroxy-11-keto-etio-cholanic acid, M. Pt. 204–207° C., which can be converted, by acetylation into 3-acetoxy-11-keto-etio-cholanic acid of M. Pt. 110–112° C. and the formula:

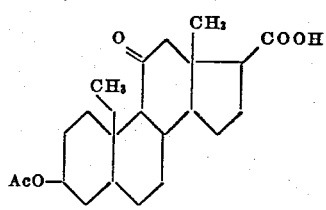

By more energetic hydrogenation, the keto group in 11-position may also be transformed into a carbinol group. The latter can be esterified in known manner.

*Example 7*

(a) 215 mg. of $\Delta^{11,12}$-3-acetoxy-etio-cholenic acid methyl-ester, M. Pt. 99–100° C. (obtained as described in U. S. patent application Serial No. 472,158) are dissolved in 15 cc. acetone. To this solution one of 150 mg. of bromacetamide in 4 cc. of water is added and the whole allowed to stand for 16 hours at room temperature. It is then diluted with water, the acetone evaporated off in vacuo and the residue extracted with ether. The ether solution is washed with sodium carbonate solution and water, dried over sodium sulphate and evaporated down. The residual crude product is recrystallized from ether. It consists of a halo-hydrin, M. Pt. 218–222° C., of the formula:

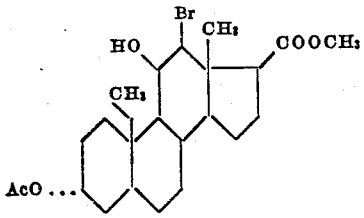

(b) 110 mg. of this crystallized oxybromide are dissolved in a little chloroform, a solution of 40 mg. chromium trioxide in 2 cc. glacial acetic acid is added, and the whole allowed to stand at room temperature for 16 hours. On working up in the usual way, the crystalline keto-bromide of the formula:

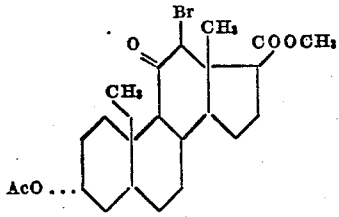

and melting at 184–189° C., is obtained.

(c) 90 mg. of the latter keto-bromide are shaken in glacial acetic acid with 250 mg. zinc dust and 50 mg. of sodium acetate for 15 minutes on a boiling water bath. On working up, 3-acetoxy-11-keto-etio-cholanic acid methyl-ester of formula:

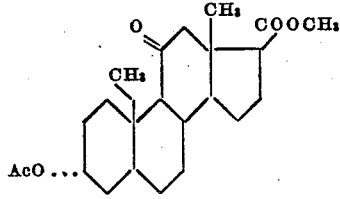

and melting at 148–151° C. is obtained. Specific rotation $[\alpha]_D^{17} = +98.1° \pm 2°$ (concentration 1.386 in acetone). By saponification with a solution of 1% hydrogen chloride in methyl alcohol, the corresponding free 3-hydroxy-11-keto-etio-cholanic acid methyl-ester is obtained which can be oxidized with chromium trioxide into 3,11-diketo-etio-cholanic acid methyl-ester, M. Pt. 186–190° C. (described in Example 5 under (c)) or reduced into a 3,11-dihydroxy-etio-cholanic acid methyl-ester.

From the mother liquors in (a) $\Delta^{9,11}$-3-acetoxy-12-keto-etio-cholanic acid methyl-ester, M. Pt. 157–160° C., can be obtained, by oxidation and debromination.

*Example 8*

To 668 mg. of $\Delta^{11,12}$-cholenic acid methyl-ester, M. Pt. 59–61° C. (prepared for example from 12-hydroxy-cholanic acid methyl-ester, M. Pt. 120–121° C., by saponification, decomposition by heating in vacuo at 240–300° C. and subsequent methylation) is added a solution of 745 mg. perbenzoic acid in 40 cc. of chloroform and the whole allowed to stand for 12 hours at room temperature. The chloroform is evaporated off in vacuo, the residue dissolved in ether, the solution washed with sodium carbonate solution and water, dried over sodium sulphate and considerably concentrated. When pentane is added, crystallization takes place. After filtering off by suction, washing with pentane and drying, 11,12-oxydo-cholanic acid methyl-ester, M. Pt. 96–97° C. is obtained. On recrystallization from methyl alcohol it melts in a pure condition at 97–98° C. Saponification with a solution of potassium carbonate in methyl alcohol gives 11,12-oxydo-cholanic acid, M. Pt. 155–157° C.

In an analogous way $\Delta^{11,12}$-3-acetoxy-cholenic acid methyl-ester, M. Pt. 117–118° C., gives 11,12-oxydo-3-acetoxy-cholanic acid methyl-ester. If one starts from an esterified $\Delta^{9,11}$-3-hydroxy-cholenic acid, such as $\Delta^{9,11}$-3-acetoxy-cholenic acid methyl-ester (obtained for example by reduction of $\Delta^{9,11}$-3-acetoxy-12-keto-cholenic acid methyl-ester with hydrazine and sodium ethylate) the corresponding 9,11-oxydo compounds can be obtained.

The oxydo compounds mentioned may be isomerized in known manner to ketones and the latter if desired be reduced to alcohols. On the other side the oxide grouping may be split up by reduction in a known manner to alcohols and the latter subsequently be oxidized, if desired, to ketones.

*Example 9*

240.7 mg. of $\Delta^{11,12}$-3-keto-cholenic acid (obtainable for example from $\Delta^{11,12}$-3-keto-cholenic acid methyl-ester, M. Pt. 122–124° C., by saponification with 2% caustic alkali in methyl alcohol) are dissolved in 6 cc. of pyridine, stable to permanganate. Then 6.50 cc. of N/10-caustic soda solution are added, so that the solution is just feebly alkaline to phenol-phthalein. A solution of 102.2 mg. potassium permanganate (1 mol) in 15 cc. water is then added in eight portions within a period of 2 hours and the reaction mixture finally allowed to stand for 2½ hours. The precipitate is filtered off and washed with a mixture of pyridine and water, the clear filtrate acidified with hydrochloric acid while cooling in ice, and the separated precipitate filtered off by suction and thoroughly washed with water. This precipitate is then dissolved in ether, the ether solution washed once again with water, dried, concentrated down considerably, and an excess of diazomethane added. After 5 minutes the solution is worked up in the usual way and a crude product is obtained which is dissolved in petroleum ether and chromatographed over 6.3 g. aluminium oxide. In this way, in addition to unchanged parent material, fractions are obtained which, on recrystallization from ether-petroleum ether mixtures and then from aqueous methyl alcohol, give platelets which melt at 105–107.5° C. after marked sintering. $[\alpha]_D^{15} = +63.4° \pm 2°$ (concentration 1.372 in methyl alcohol). This substance is a 3-keto-11,12-dihydroxy-cholanic acid methyl-ester.

By splitting off water from this compound, for example by distillation with zinc dust, a diketo-cholanic acid methyl-ester is obtained. Otherwise by mild oxydation or better by dehydrogenation, for example with a ketone in presence of a metal alcoholate or phenolate, the 11,12-dihydroxy compound yields the 3,11,12-triketo-cholanic acid methyl-ester.

*Example 10*

1.3 g. of $\Delta^{11,12}$-cholenic acid methyl-ester, M. Pt. 59–61° C., are dissolved in 50 cc. of absolute ether, a solution of 1 g. of osmium tetroxide in 50 cc. of absolute ether is added and the whole allowed to stand for three days at room temperature. The dark solution is then concentrated down at first on a water bath and then in vacuo. The residue is dissolved in 10 cc. of benzene and 50 cc. of alcohol, a hot solution of 2 g. of potassium hydroxide and 2 g. of crystallized sodium sulphite in 12 cc. of water added hot to the solution obtained, and the mixture boiled for 3 hours under reflux. 2 cc. of saturated aqueous saline with 8 cc. of alcohol is then added to the filtered mixture to produce better separation of the flocculent precipitate and the whole boiled for another hour whereby the benzene is allowed to distil off, replacing it with alcohol saturated with sodium chloride. It is then filtered hot and thoroughly washed out with hot alcohol which is saturated with sodium chloride.

To the alkaline filtrates, which should have at the most a yellowish colour, water is added, and then, to prevent frothing, acetic acid until the mixture has a faintly acid reaction to litmus. Then they are completely freed from alcohol in a vacuum. Hydrochloric acid is added until the residue has an acid reaction to Congo when it is extracted with ether. The ether solution is washed with some water, dried over sodium sulphate, and a solution of diazomethane in ether added until a permanent yellow colouration is obtained. After 10 minutes, it is washed with aqueous hydrochloric acid, sodium carbonate solution and water, dried over sodium sulphate and evaporated down. There remains a light brown residue, which crystallizes after a few hours.

The crystals are purified by dissolving in a mixture of benzene and petroleum-ether (1:4) and filtering the solution through a column of 30 g. aluminium oxide prepared with petroleum ether. The filtrates obtained with benzene-petroleum ether mixtures (1:1) and, in particular, those obtained with absolute benzene give, on evaporating down, residues which crystallize from a little absolute ether by addition of petroleum ether in colourless needles, M. Pt. 83–85° C., or in bunches of coarse, pointed needles, melting at 103–104° C. They consist of 11,12-dihydroxycholanic acid methyl-ester, which forms crystal dimers. The specific rotation of the preparation melting at 83–85° C. is $[\alpha]_D^{16} = +11.3° \pm 1°$ (concentration 1.86 in methyl alcohol). The preparation melting at 103–104° C. has an identical specific rotation of $[\alpha]_D^{15} = +12.2° \pm 1°$ (concentration 1.973 in methyl alcohol).

Both preparations prove not to be identical with a presumably stereoisomeric 11,12-dihydroxy-cholanic acid methyl-ester, which is obtained from $\Delta^{11,12}$-cholenic acid by treatment with potassium permanganate and subsequent methylation in an analogous manner to that described in Example 9.

30 mg. of 11-12-dihydroxy-cholanic acid methyl-ester, M. Pt. 83.5° C. or 103–104° C. are boiled for 15 minutes with a solution of 8 mg. potassium hydroxide in 0.5 cc. methyl alcohol. Some water is then added, the methyl alcohol removed in vacuo, and the remaining mixture extracted with ether after the addition of hydrochloric acid. The ether solution is washed with water, dried over sodium sulphate, considerably concentrated, and pentane added. The free 11,12-dihydroxy-cholanic acid thus obtained crystallizes in small needles, which collect in aggregates, having a M. Pt. 211–214° C.

100 mg. of 11,12-dihydroxy-cholanic acid methyl-ester, M. Pt. 83–85° C., or 103–104° C. are boiled with 0.6 cc. of acetic anhydride and 1 cc. of pyridine for 8 hours under reflux. The mixture is then evaporated down in vacuo, the residue dissolved in ether, the ether solution washed with hydrochloric acid, sodium carbonate solution and water, dried with sodium sulphate and evaporated down. The residue gives, when recrystallized from methyl alcohol, 11,12-diacetoxy-cholanic acid methyl-ester in colourless rods, M. Pt. 108–110° C., $[\alpha]_D^{13} = +1.5° \pm 1°$ (concentration 1.94 in acetone). By heating this compound with zinc dust in toluene in known manner and subsequent saponification of the product with an alcoholic solution of potassium hydroxide, a ketocholanic acid is obtained, which after treatment with diazomethane yields a keto-cholanic acid methyl-ester.

If instead of $\Delta^{11,12}$-cholenic acid methyl-ester there are used as starting materials corresponding derivatives, containing an additional hydroxyl, acyloxy or keto group in 3-position of the cholene or etiocholene nucleus, correspondingly substituted products of the said series are obtained.

*Example 11*

300 mg. of $\Delta^{11,12}$-cholenic acid methyl-ester are dissolved in 60 cc. of acetone, a solution of 222 mg. bromacetamide (2 mols) is added and the whole allowed to stand for 16 hours at room temperature. The acetone is removed in vacuo, water added to the residue and the whole extracted with ether. The ether solution is washed with sodium carbonate solution and water, dried over sodium sulphate and evaporated down. The residue is treated in a column as used for chromatography by aluminium oxide. At first a dibromide, M. Pt. 101.5–103.5° C. is eluted with petroleum ether. The fractions extracted afterwards with petroleum ether and a mixture of petroleum ether and benzene (3:7) give, on recrystallization from aqueous methyl alcohol, the $\alpha$-oxide, M. Pt. 64.5–65.5° C., which has the formula:

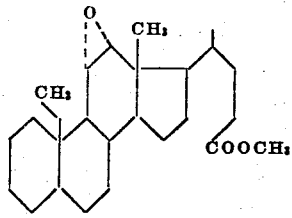

Further eluates probably contain the 9,11-dibromo-12-hydroxycholanic acid methyl-ester, as debromination of this product with zinc dust and subsequent oxidation with chromic acid yield the $\Delta^{9,11}$-12-keto-cholenic acid methyl-ester.

The same $\alpha$-oxide can also be obtained by treating the crude product of the bromacetamide reaction with zinc dust or other agents which eliminate hydrohalide.

86 mg. of the $\alpha$-oxide described are dissolved in 3 cc. of methyl alcohol, the quantity of Raney catalyst obtained from 300 mg. of alloy is added, and hydrogenation performed during 2½ hours at 100° C. and 120 atmospheres in a rotating autoclave. After filtration the solution is evaporated down, the residue dissolved in ether and the ether solution washed with sodium carbonate solution and water, dried over sodium sulphate and evaporated down. The residue is chromatographed over aluminium oxide. The fractions extracted with petroleum ether crystallize from methyl alcohol and thus give a small quantity of cholanic acid methyl-ester. The 11-hydroxy-cholanic acid methyl-ester, M. Pt. 87–88° C., already described in Example 3, is eluted with mixtures of benzene and petroleum-ether in the concentrations 1:9 till 3:7. It has the formula:

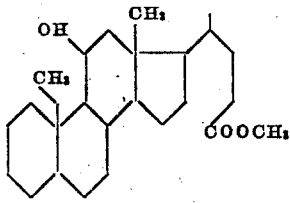

On oxidation with chromic acid in glacial acetic acid it gives, in almost quantitative yield, the 11-keto-cholanic acid methyl-ester, M. Pt. 88° C.

Instead of a hydrogenation of the α-oxide with subsequent oxidation, also an isomerization may be performed directly to the ketone in known manner. The latter may afterwards be reduced to the alcohol.

*Example 12*

500 mg. of $\Delta^{11,12}$-3-keto-cholenic acid methyl-ester, M. Pt. 120–122° C., are dissolved in 40 cc. of acetone, a solution of 350 mg. of bromacetamide (2 mols) in 10 cc. of water is added and the whole allowed to stand for 16 hours at room temperature. After the addition of water, the acetone is removed in vacuo and the residue extracted with ether. The ether solution is washed with dilute sodium carbonate solution and water, dried over sodium sulphate and evaporated down. The residue is treated according to the chromatographic method with 20 g. of aluminium oxide. The eluates with benzene and benzene-ether mixtures (50:1) give the 3-keto-11,12-dibrom-cholanic acid methyl-ester in colourless needles, which melt after recrystallization from ether-petroleum ether, at 136–138° C. By debromination they yield the parent substance. Further fractions extracted with benzene-ether mixtures of increasing ether content, and with pure ether, give the 11,12-α-oxido-3-keto-cholanic acid methyl-ester which melts, on recrystallization from petroleum ether, at 122–124° C. It has the formula:

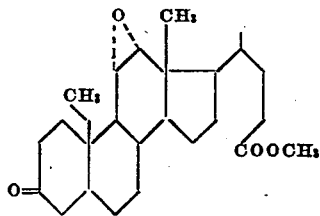

The further fractions eluted with ether-methyl alcohol (9:1) give on oxidation with chromic acid and debromination with zinc dust, $\Delta^{9,11}$-3,12-diketo-cholenic acid methyl-ester.

The oxide described yields, on hydrogenation, a reaction product which forms, after acetylation with acetic anhydride and pyridine at room temperature, in addition to the 3 - acetoxy - 11 - hydroxy - cholanic acid methyl - ester, M. Pt. 146–148° C., described in example 5, the ester which is stereoisomeric in 3 position and shows a M. Pt. of 141–142° C., and a specific rotation $[\alpha]_D^{20} = +50°$ (acetone).

*Example 13*

(a) 650 mg. of $\Delta^{11,12}$ - pregnene - 3,20 - dione, M. Pt. 131–133° C., (obtainable for example from pregnane-12-ol-3,20-dione, M. Pt. 182–184° C., by benzoylation and subsequent elimination of benzoic acid) are dissolved in 100 cc. of acetone; 0.6 g. of N-bromacetamide and 40 cc. of water is added, and the whole allowed to stand for 15 hours at 20° C. The initially colourless solution becomes yellow after a few hours, but is again colourless after 15 hours. After the addition of some water the acetone is removed in vacuo, when the majority of the organic material is deposited on the sides of the flask as a resinous mass. The water is poured off and the resin washed twice with a little fresh water. The washings are twice extracted with a large volume of ether and a little absolute ether added to the resin alone, when considerable quantities of crystals remain undissolved; these are filtered off by suction, well washed with ether and dried in vacuo. They are mostly triangular, colourless platelets which melt with decomposition at about 238–245° C. They consist of the halohydrin of the formula:

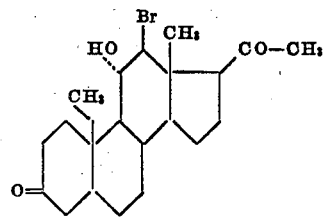

Instead of the $\Delta^{11,12}$-pregnene-3,20-dione there may be used as starting materials other pregnene-derivatives, containing for example in 3 and 20 position free or acylated hydroxyl groups.

(b) 420 mg. of the crystallized halohydrin are suspended in 25 cc. of chloroform (as free from alcohol as possible), 10 cc. of very pure glacial acetic acid, and then 5 cc. of a 2% solution of chromium trioxide in glacial acetic acid (100 mg. $CrO_3$) are added, and the whole is allowed to stand at room temperature. The chloroform is then removed as far as possible in vacuo at a bath temperature of 20° C., 10 cc. of glacial acetic acid and 2.5 cc. of the 2% chromic acid solution are furthermore added to the residue and the whole is again allowed to stand at 20° C. If no more free chromic acid is detectable after 3 hours, 2.5 cc. of the 2% solution are again added and this procedure is repeated until chromic acid can be definitely detected after standing for 3 hours. Altogether about 21 cc. of the 2% solution (420 mg. $CrO_3$) are necessary. On working up in the usual way 12-brom-pregnane-3,11,20-trione is obtained as colourless platelets, M. Pt. 176–184° C.

(c) 240 mg. of this keto bromide are dissolved in 10 cc. of glacial acetic acid, 400 mg. of zinc dust added and the whole heated for 15 minutes to 80° C., rotating continually. By filtration, evaporation of the filtrate in vacuo, addition of water to the residue and extraction with ether, pregnane-3,11,20-trione is obtained as bunches of needles, M. Pt. 154–156° C.

The mother liquors of stage (a) of the reaction are oxidized as described in (b) and the oxidation product is debrominated together with the mother liquors of stage (b) of the reaction. In this way some $\Delta^{9,11}$-pregnene-3,11,20-trione, M. Pt. 184–186° C., can be obtained in addition to a further quantity of pregnane-3,11,20-trione.

The latter compound may be reduced, e. g. by catalytic hydrogenation, to the pregnane-3,11,20-triols and these, if desired, esterified and hereupon partially saponified in 3 and 20 position. By oxidation of the 11-monoester, for example with chromic acid, the pregnane-3,20-dione-11-ole-ester is obtained. This compound in free form, may be obtained directly, e. g. by partial oxydation or better dehydrogenation of the triols.

(d) 66 mg. of pregnane-3,11,20-trione are dissolved in 2 cc. of pure glacial acetic acid, a drop of 30% hydrogen bromide in glacial acetic acid is added and then gradually a solution of 31.4 mg. bromine in 1 cc. of glacial acetic acid while rotating; the bromine is used up almost immediately. After decolourization the solution is evaporated to dryness in vacuo at a bath temperature of 20° C., a little ether added to the residue and the latter again well dried in vacuo. After again dissolving in absolute ether, bunches of needles soon separate out, which melt, after washing with ether, at 158–160° C. They consist of 4-brom-pregnane-3,11,20-trione.

(e) 127 mg. of this bromide are boiled for 6 hours under reflux with 2 cc. of absolute pyridine. After evaporating down in vacuo, the residue is dissolved in ether, the solution washed with dilute hydrochloric acid, sodium carbonate solution and water, dried over sodium sulphate and evaporated down. It is then distilled in a high vacuum at a bath temperature of 170° C. The distillate crystallizes from ether. The granules obtained are further purified by chromatography over a small column of 1 g. aluminium oxide. The first fractions extracted with a mixture of benzene and petroleum-ether (1:4) give still impure crystals. The further eluates obtained with benzene-petroleum ether, and with benzene yield, on recrystallization from ether, colourless rods melting at 173–175° C.

$[\alpha]_D^{18} = +243.5° \pm 6°;$ $[\alpha]_{5461}^{18} = +283° \pm 6°$ (concentration 0.382 in acetone). The 11-keto-progesterone prepared from corticosterone (Helv. Chim. Acta, vol. 23, page 684 [1940]) of the formula

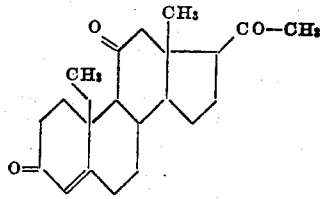

shows under the same conditions an identical melting point and the same specific rotation. The mixed melting point shows no depression.

*Example 14*

The preparation of the parent material used in this example can be carried out as described in the process of U. S. patent application Serial No. 433,072 or in the following way:

$\Delta^{11}$-3-hydroxy-etio-cholenic acid methyl-ester is saponified, acetylated, converted into the acid chloride with thionyl chloride, and this acid chloride allowed to react with an excess of an ether solution of diazomethane. The crude acetylated diazoketone is saponified with methyl alcoholic caustic soda at room temperature and the hydroxy diazoketone obtained converted, by heating with glacial acetic acid, into $\Delta^{11}$-21-acetoxy-pregnene-3-ol-20-one. The latter is converted into $\Delta^{11}$-21-acetoxy-pregnene-3,20-dione by boiling with benzene, acetone and aluminium phenolate or by allowing to stand with approximately the calculated quantity of chromic acid in glacial acetic acid. This compound can be purified by chromatography or by recrystallization from ether. For the following reaction, however, crude products which do not have a sharp melting point, can also be used.

1 part of this $\Delta^{11}$-21-acetoxy-pregnene-3,20-dione is dissolved in 25 parts of acetone, a solution of 0.75 part of N-bromacetamide in 6 parts of water is added and the whole allowed to stand for 16 hours at room temperature. About 6 parts of water are then added, the acetone removed in vacuo and the residue extracted several times with ether. The ether solution, after washing with water and sodium carbonate solution, is dried and evaporated down. The crystalline residue is dissolved in 18 parts of very pure glacial acetic acid, 18 parts of a solution containing 2% of chromium trioxide added and the whole allowed to stand for 16 hours at 18° C. Two parts of 2% chromium trioxide solution are then again added and the procedure repeated until some chromic acid is detectable in a sample of the solution after a reaction time of 5 hours. The solution is then evaporated down to a small volume at a bath temperature of 30° C., water is added and extraction with ether performed. 0.6 part of zinc dust and 0.5 part of anhydrous sodium acetate are added to the ether solution, the latter concentrated down, and 3 parts of glacial acetic acid added to the residue. The whole is heated for 15 minutes on a boiling water bath, rotating continually. It is then filtered, washed with ether, the filtrate evaporated down in vacuo, water added to the residue and the whole extracted with a large volume of ether. The ether solution, after washing with dilute hydrochloric acid, sodium carbonate solution and water and drying over sodium sulphate gives 0.9–1 part of a crude product, which is purified by chromatography. In particular the fractions eluted with absolute benzene crystallize from ether-petroleum ether mixtures in colourless needles, melting at 152–154° C. The product has a specific rotation $[\alpha]_D^{22} = +107°$ (acetone), and reduces alkaline silver diamine solution rapidly and effectively at room temperature. It consists of 21-acetoxy-pregnane-3,11,20-trione.

The same compound can be obtained from $\Delta^{11}$-21-acetoxy-pregnene-3-ol-20-one (which is itself obtainable from $\Delta^{11}$-3-acetoxy-etio-cholenic acid via the acid chloride and diazoketone) by reacting directly with 3 mols of bromacetamide, oxidizing and debrominating. The simplest procedure is to start directly from the mixture of compounds isomeric in 3-position, as it is obtained from the product arising by reduction of the 3-keto-acid ester. If, however, one starts from a derivative containing an esterified hydroxyl in 3-position, the corresponding products, containing in this position an esterified or free hydroxyl may be obtained.

By mixing 10 parts of bromine with 384 parts of glacial acetic acid an N/1-bromine solution is prepared; to 9.6 parts of the product, M. Pt. 152–154° C., dissolved in 50 parts of glacial acetic acid, 2 drops of the above bromine solution are added. After a few minutes the solution is suddenly decolourized after which 48 parts of the bromine solution are slowly added, cooling and rotating, and are decolourized almost instantaneously. After evaporating down the solution in vacuo at a bath temperature of 25° C. crystallization occurs. The colourless crystals melt, after washing with ether, at 180–185° C. They consist of 4-brom-pregnane-3,11,20-trione-21-ol-acetate.

This bromide is boiled under reflux for 5 hours with 100 parts of absolute pyridine. After evaporating down in vacuo, the residue is dissolved in a large volume of ether, the ethereal solution washed with a little dilute hydrochloric acid, sodium carbonate solution and water, dried over sodium sulphate and evaporated down. The residue is purified chromatographically over a column of aluminium oxide, when the first fractions extracted with benzene give crystals with a low indefinite melting point. The further eluates obtained with benzene, and benzene-ether mixtures yield, after recrystallizing twice from acetone-ether, colourless needles, melting at 175–178° C. and showing a specific rotation $[\alpha]_D^{22} = +211° \pm 3°$ (concentration 0.676 in acetone). They consist of $\Delta^4$-pregnene-3,11,20-trione-21-ol-acetate (dehydro-corticosterone acetate). A sample of very pure natural dehydro-corticosterone acetate melts under the same conditions at 177–179° C., shows no depression of the melting point in mixture with the synthetic product, and has the same specific rotation.

By saponification with a methyl alcoholic solution of hydrogen chloride or an aqueous methyl alcoholic solution of potassium bicarbonate, free dehydro corticosterone, M. Pt. 174–180° C. is obtained. The latter may subsequently be converted in known manner into any ester such as the propionate, palmitate, benzoate, succinate, the butyrates, phosphates or carbonic acid esters.

The 21-acetoxy-pregnane-3,11,20-trione described or a corresponding ester may be hydrogenated to the 3,11,20,21-triol-21-monoesters and then partially reoxidized or redehydrogenated, as described in Example 13, to the pregnane-11,21-diol-3,20-dione-21-monoesters. The latters finally may be esterified in 11 position also.

What I claim is:

1. An etiocholane containing a ketonic oxygen at the carbon atom 11 and a halogen atom at the carbon atom 12.

2. A pregnane containing a ketonic oxygen at the carbon atom 11 and a halogen atom at the carbon atom 12.

3. An etiocholane containing a ketonic oxygen at the carbon atom 11 and a halogen atom at the carbon atom 12, and also containing a member selected from the group consisting of acyloxy and ketonic oxygen at the carbon atom 3.

4. A pregnane containing a ketonic oxygen at the carbon atom 11 and a halogen atom at the carbon atom 12, and also containing a member selected from the group consisting of acyloxy and ketonic oxygen at the carbon atom 3.

5. An etiocholane containing a ketonic oxygen at the carbon atom 11 and a halogen atom at the carbon atom 12, and also containing a member selected from the group consisting of acyloxy and ketonic oxygen at the carbon atom 3 and a carbalkoxy group at the carbon atom 17.

6. An etiocholane containing a ketonic oxygen at the carbon atom 11 and a halogen atom at the carbon atom 12, and also containing a member selected from the group consisting of acyloxy and ketonic oxygen at each of the carbon atoms 3 and 20.

7. An etiocholane containing a ketonic oxygen at the carbon atom 11 and a halogen atom at the carbon atom 12, and also containing a member selected from the group consisting of acyloxy and ketonic oxygen at each of the carbon atoms 3 and 20 and an esterified hydroxyl at the carbon atom 21.

8. A cyclopentanopolyhydrophenanthrene containing a ketonic oxygen at the carbon atom 11 and a halogen atom at the carbon atom 12.

9. A cholane containing a ketonic oxygen at the carbon atom 11 and a halogen atom at the carbon atom 12, and also containing a member selected from the group consisting of acyloxy and ketonic oxygen at the carbon atom 3.

10. A cholane containing a ketonic oxygen at the carbon atom 11 and a halogen atom at the carbon atom 12, and also containing a member selected from the group consisting of acyloxy and ketonic oxygen at the carbon atom 3, the carbon atom 24 being contained in a carbalkoxy group.

11. A process for the manufacture of a cyclopentanopolyhydrophenanthrene which contains an OH-group in 11-position and a halogen atom in 12-position, which comprises causing a cyclopentanopolyhydrophenanthrene which contains a nuclear double bond in 11,12-position, to react in aqueous medium with bromacetamide, whereby an addition product results wherein the 11-position is occupied by an OH-group and the 12-position by a halogen atom.

12. A process for the manufacture of a cyclopentanopolyhydrophenanthrene which contains an OH-group in 11-position and a halogen atom in 12-position, which comprises causing a cyclopentanopolyhydrophenanthrene which contains a nuclear double bond in 11,12-position, to react in aqueous medium with hypohalogenous acid, whereby an addition product results wherein the 11-position is occupied by an OH-group and the 12-position by a halogen atom.

TADEUS REICHSTEIN.

Certificate of Correction

Patent No. 2,403,683 — July 9, 1946.

TADEUS REICHSTEIN

It is hereby certified that errors appear in the printed specification of the above numbered patent requiring correction as follows: Column 3, line 45, Example I, for "(480° mg. CrO$_3$)" read *(480 mg. CrO$_3$)* ; column 15, lines 10 to 12, Example 11, for that portion of the formula reading

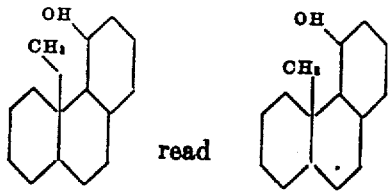

column 18, line 43, Example 14, for "silver diamine" read *silver diammine* ; and that the said Letters Patent should be read with these corrections therein that the same may conform to the record of the case in the Patent Office.

Signed and sealed this 24th day of September, A. D. 1946.

[SEAL]

LESLIE FRAZER,
*First Assistant Commissioner of Patents.*